(12) United States Patent
Hedman

(10) Patent No.: US 6,289,584 B1
(45) Date of Patent: Sep. 18, 2001

(54) METHOD OF MANUFACTURING OF A PLATE TYPE HEAT EXCHANGER

(75) Inventor: Erik Hedman, Linkoping (SE)

(73) Assignee: Volvo Lastvagnar AB, Gothenburg (SE)

( * ) Notice: Subject to any disclaimer, the term of this patent is extended or adjusted under 35 U.S.C. 154(b) by 0 days.

(21) Appl. No.: 09/419,368

(22) Filed: Oct. 15, 1999

Related U.S. Application Data

(63) Continuation of application No. PCT/SE98/00718, filed on Apr. 21, 1998.

(30) Foreign Application Priority Data

Apr. 22, 1997 (SE) .................................................... 9701490

(51) Int. Cl.⁷ .................................................... B23P 15/26
(52) U.S. Cl. .................................... 29/890.034; 29/890.054
(58) Field of Search ........................ 29/890.039, 890.03, 29/890.054; 228/183; 165/153

(56) References Cited

U.S. PATENT DOCUMENTS

| | | | |
|---|---|---|---|
| 4,434,634 | * | 3/1984 | Almqvist et al. ........................ 72/379 |
| 4,592,414 | * | 6/1986 | Beasley .................................. 165/76 |
| 4,600,053 | * | 7/1986 | Patel et al. ............................. 165/173 |
| 4,846,268 | * | 7/1989 | Beldam et al. ........................ 165/153 |
| 4,915,163 | * | 4/1990 | Matsunaga et al. ............. 29/890.039 |
| 5,184,673 | * | 2/1993 | Hedman et al. ................. 29/890.039 |
| 5,555,933 | | 9/1996 | Darragh et al. . |

FOREIGN PATENT DOCUMENTS

| | | |
|---|---|---|
| 0 460 872 | 5/1991 | (EP) . |
| 0 736 346 | 10/1996 | (EP) . |
| 2 107 845 | 5/1983 | (GB) . |
| 95/17272 | 6/1995 | (WO) . |

OTHER PUBLICATIONS

5/85 "Development, Fabrication and Application of Primary Surface Gas Turbine Recuperator" Parsons, SAE Technical Paper Series 851254.

\* cited by examiner

*Primary Examiner*—I Cuda Rosenbaum
(74) *Attorney, Agent, or Firm*—Altera Law Group, LLC

(57) ABSTRACT

The invention related to a method in the manufacture of a plate heat exchanger (1), preferably a so-called recuperator. This has flow channels arranged between the plates, every other channel being designed to accommodate the flow of a heat-emitting medium and every second channel the flow of a heat-absorbing medium. The flow channels for one of the media, preferably the heat-absorbing medium, are connected in parallel to manifolds for the said medium. The plates also have a raised pattern designed to produce a counter-flow section and two cross-flow sections in the recuperator, one on either side of the counter-flow section, the cross-flow sections having a lower raised pattern height than the counter-flow section. By means of a punching and pressing operation openings (4', 6') are made in each plate, with side walls formed around the edges of the openings. Following a joining process, in which the side walls undergo pressure resistant jointing, the side walls from walls of the manifolds (4, 6). The entire raised patterns of the counter-flow section and the cross-flow sections on each plate are pressed to their respective raised pattern height in the said pressing operation.

4 Claims, 4 Drawing Sheets

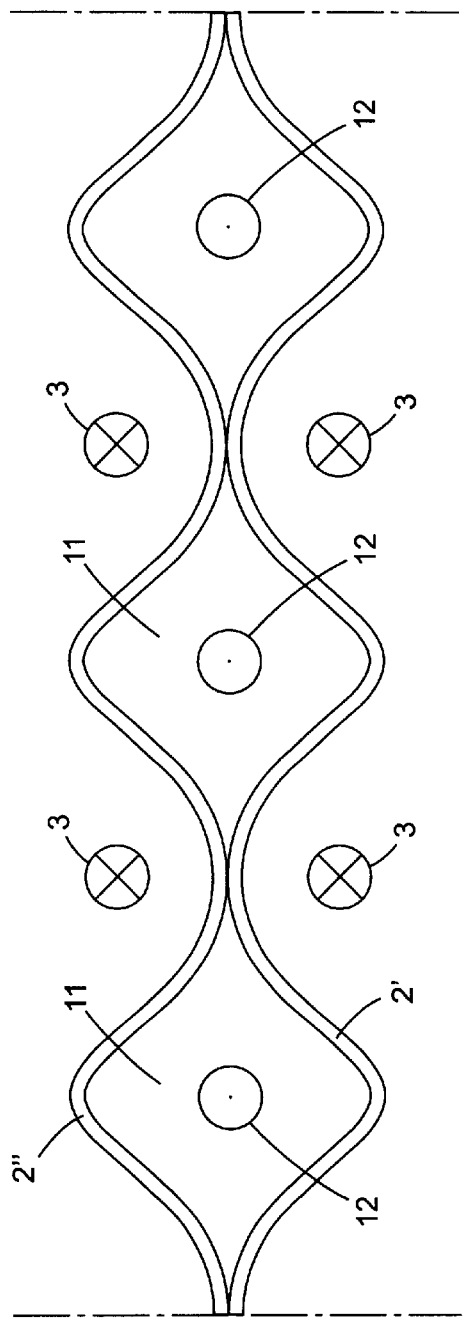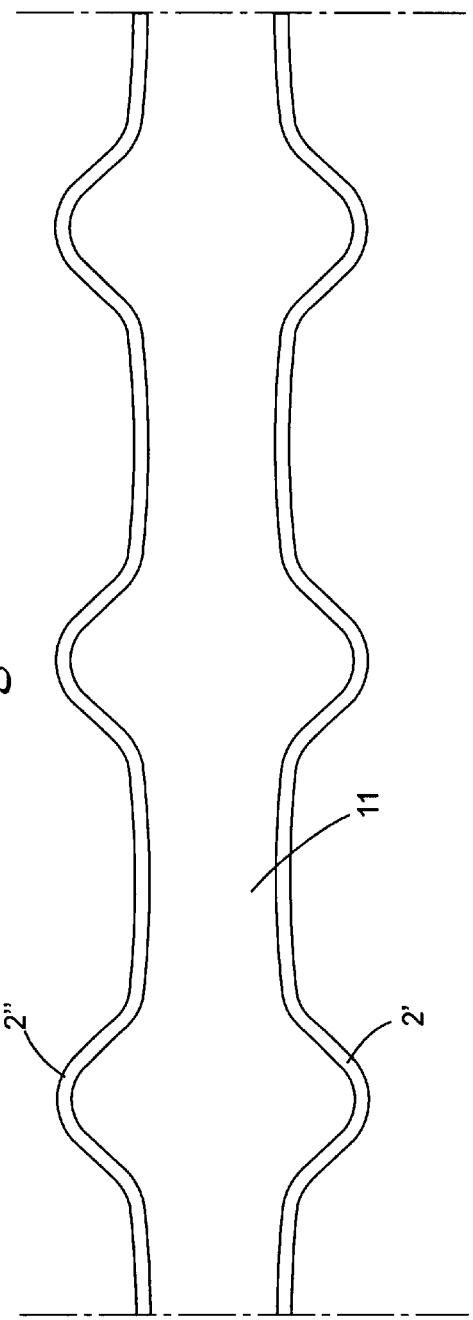

METHOD OF MANUFACTURING OF A PLATE TYPE HEAT EXCHANGER

This is a continuation of PCT/SE98/00718 filed Apr. 21, 1998.

FIELD OF THE INVENTION

The present invention relates to a method in the manufacture of a plate heat exchanger, preferably a so-called recuperator, with flow channels arranged between the plates, every other channel being designed to accommodate the flow of a heat-emitting medium and every second channel the flow of a heat-absorbing medium and the flow channels for one of the media, preferably the heat-absorbing medium, being connected in parallel to manifolds for the said medium, the plates having a raised pattern designed to produce a counter-flow section and two cross-flow sections in the recuperator, one on either side of the cross-flow section, and the cross-flow sections having a lower raised pattern height than the counter-flow section.

DESCRIPTION OF RELATED ART

With regard to the prior art, reference is made, among other things, to U.S. Pat. No. 5, 555,933 and to SAE Technical Paper series 851254 "Development, Fabrication and Application of a Primary Surface Gas Turbine Recuperator" E.C Parsons, Solar Turbines Inc, San Diego, Calif, Govemment/Industry Meeting 2 Exposition, Washington D.C, 20–23, May 1985.

The above-mentioned publications described how the heat-absorbing medium is made to flow in a zigzag by the relatively lower raised pattern height prevailing in the cross-flow section, compared to the counter-flow section. The different raised pattern heights were produced by deformation in the cross-flow areas of plate patterns pressed gradually undulation by undulation to the same height, leaving the original raised pattern height in the counter-flow area. The manifolds were made as separately formed elements connected to the plates.

SUMMARY OF THE INVENTION

The object of the present invention is to achieve a relatively simplified method of manufacture of the type outlined above. According to the invention this is achieved in that openings are made in each plate by a punching and pressing operation, with side walls formed around the edges of the openings, the said side walls, following a joining process in which they undergo pressure resistant jointing, forming the manifolds, and that the entire raised patterns for the counter-flow section and the cross-flow sections on each plate are pressed to their respective raised pattern height in the said pressing operation.

BRIEF DESCRIPTION OF THE DRAWINGS

The invention will be explained in more detail below with reference to the attached drawings, in which.

FIG. 3 in a longitudinal section A—A through FIG. 2 shows flow channels formed between two plates and FIGS. 4 and 5 show wave patterns of the plates in two sections through the plate heat exchanger, the positions of which are indicated by B and C respectively in FIG. 3.

These sections consequently lie in the cross-flow and counter-flow areas of the plate heat exchanger.

DETAILED DESCRIPTION OF THE INVENTION

Figure 1:
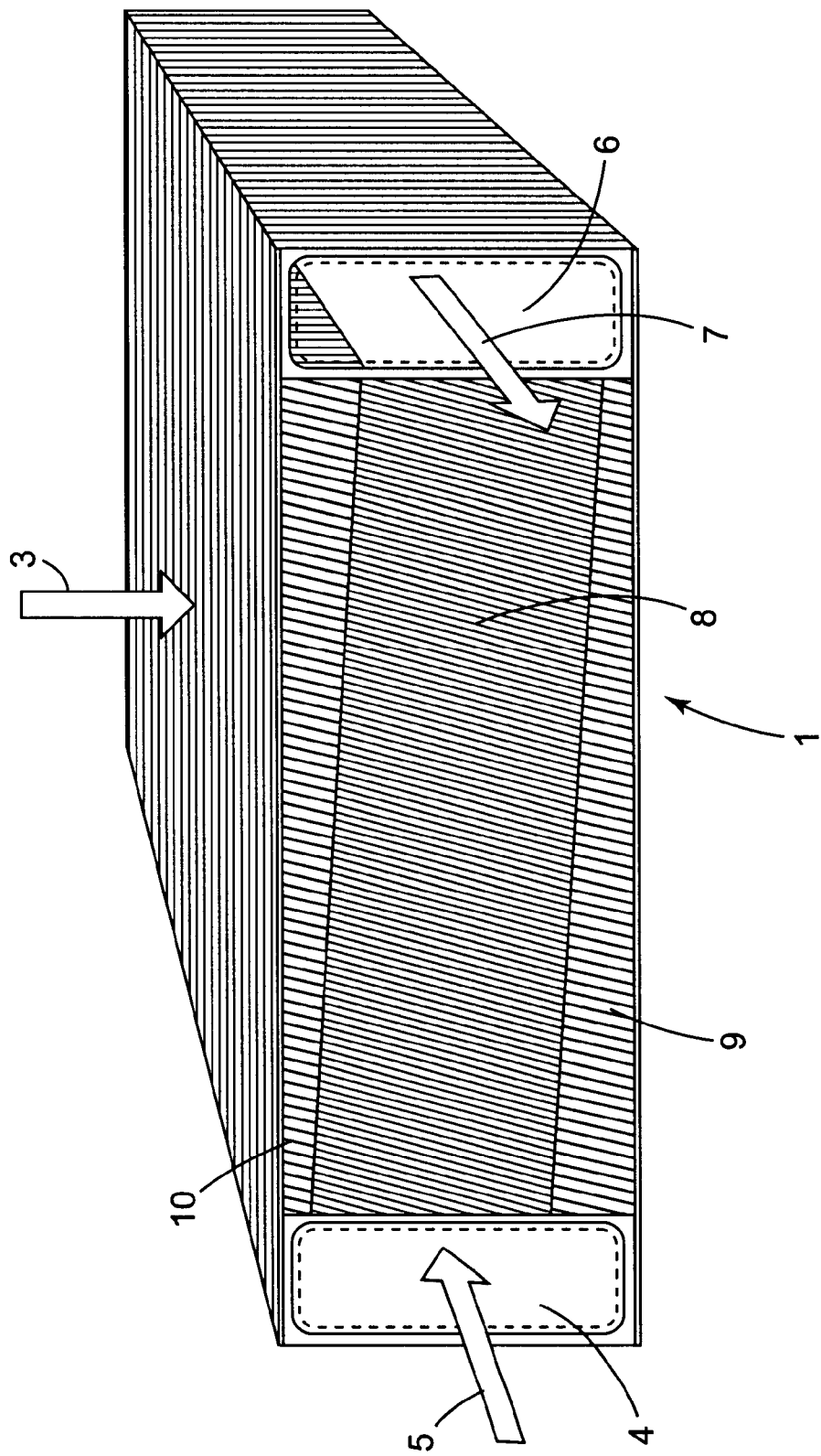
FIG. 1 shows a perspective view of a plate heat exchanger.
Figure 2:
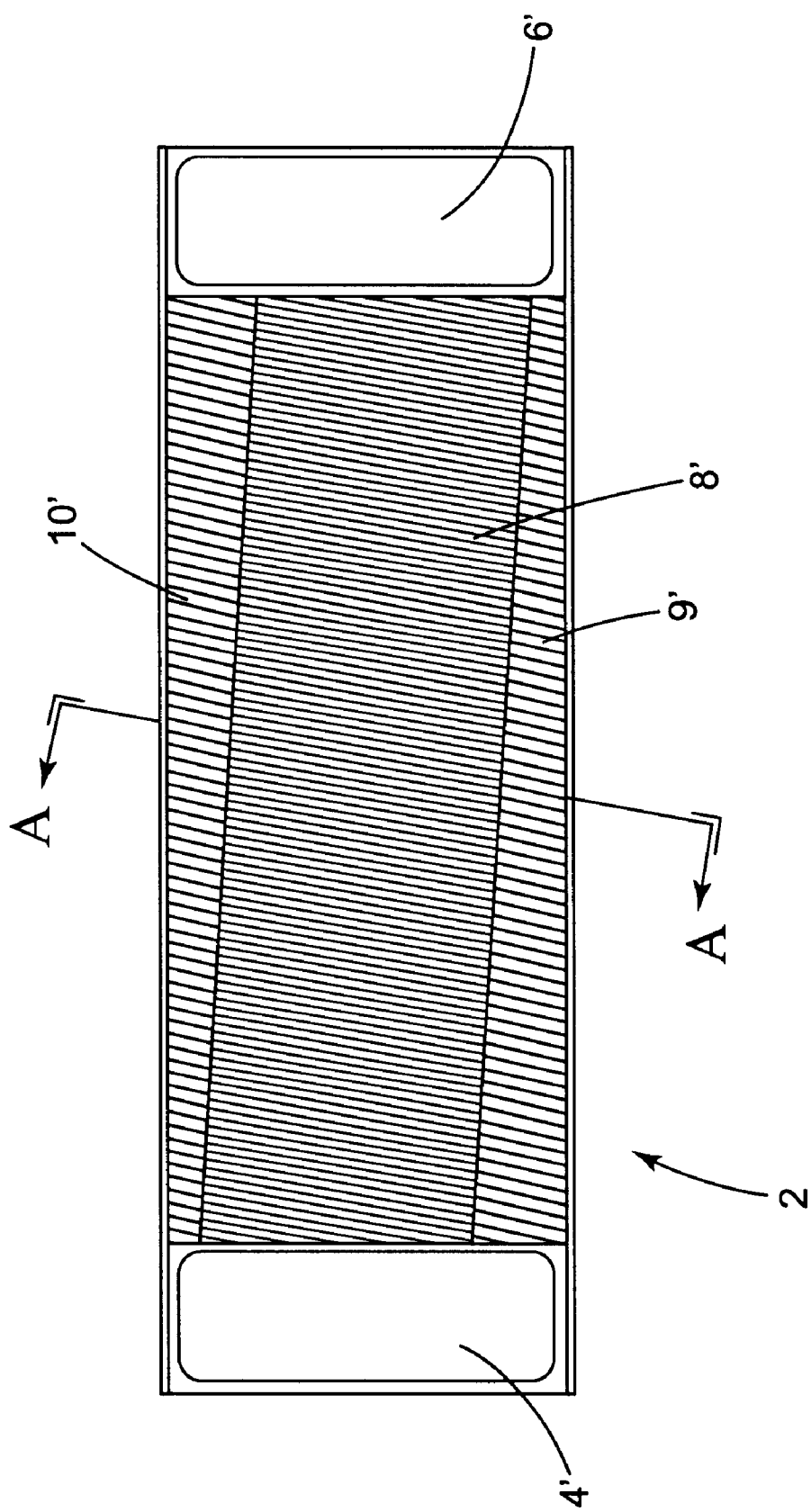
FIG. 2 shows a plan view of a heat exchanger plate.

FIG. 1, one generally denotes a plate heat exchanger, preferably a recuperator, the plates of which are manufactured by the method to which the invention relates. In FIG. 2 such a plate is generally denoted by 2. Between the plates, flow channels are arranged, every other one of which is designed to accommodate the flow of a heat-emitting medium and every second one of which the flow of a heat-absorbing medium. The direction of flow of the heat-emitting medium in FIG. 1 is indicated by an arrow 3. The person skilled in the art will appreciate that a casing surrounding the set of plates in FIG. 1, with inlet and outlet connections, is required in order to control the flow of the heat-emitting medium. The heat-absorbing medium flows into the heat exchanger by way of a manifold connecting with the flow channels for this medium, as indicated by an arrow 5, and leaves the heat exchanger by way of a manifold 6, as indicated by an arrow 7.

As is known, the flows of the heat-emitting and the heat-absorbing medium must be in opposite directions in order to achieve high thermal efficiency. This is the case in a section marked 8. In two sections 9 and 10, situated on either side this, the flow directions cross one another. The manifold 4 connects with the cross-flow section 9 and the manifold 6 with the cross-flow section 10, so that the said zigzag flow referred to at the outset is obtained between the manifolds 4, 6.

The plate 2 shown in FIG. 2 has openings 4', 6' with peripheral side walls, which form the walls of the manifolds 4, 6, and undulating raised pattern areas 8', 9' and 10', which form the counter-flow and the cross-flow areas 8 or 9 and 10 respectively. The openings 4', 6' are produced by a punching operation and the flanges by a simultaneous pressing operation.

According to the invention the raised pattern is also pressed in the same pressing operation.

Figure 3:
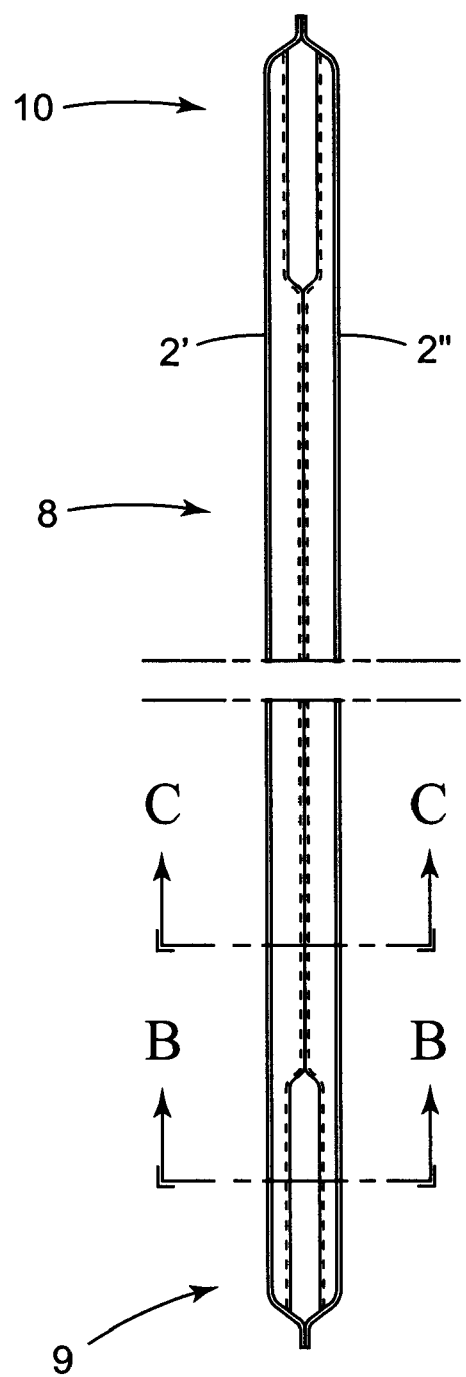

FIG. 3, as stated, shows the longitudinal section A—A in FIG. 2, in which two plates 2', 2" form a flow channel for the heat-emitting medium. The section is situated along one of the top lines of the undulating pattern. The counter-flow section 8 and on either side of this the two cross-flow sections 9, 10 can be clearly identified.

In the counter-flow section, the plates 2', 2", as shown in FIG. 4, form flow channels 11, which control the flow of heat-absorbing medium, in FIG. 4 marked by the symbol for an incoming arrow 12 counter to the direction of flow of the heat-absorbing medium, which in FIG. 4 is identified in that the arrow 3 in FIG. 1 has the symbol for an outgoing arrow.

As will be seen from FIG. 5, in the cross-flow sections 9, 10 the profile pattern height of the plates 2', 2" is reduced compared to that in the counter-flow section 8. Reducing the pattern height widens the flow channels 11 for the heat-absorbing medium in these sections, which brings about a less pronounced control of the flow direction, resulting in the flow directed from or to the manifolds 4, 6.

What is claimed is:

1. A method for manufacturing a plate heat exchanger, comprising:

forming a plurality of flow channels between a plurality of plates, the plates having a raised pattern to produce a counter-flow section and two cross-flow sections, each cross-flow section on either side of the counter-flow section, and the cross-flow sections having a lower raised pattern height than the counter-flow section, punching and pressing openings in each plate, wherein side walls are formed around the edges of the openings, joining the side walls by pressure resistant jointing to form manifolds, and pressing an entire raised patterns of the counter-flow section and the cross-flow sections on each plate to their respective raised pattern height.

2. The method of claim 1, wherein the forming of flow channels further comprises forming every other flow channel to accommodate the flow of a heat-emitting medium and every second channel to accommodate the flow of a heat-absorbing medium.

3. The method of claim 2, further comprising flowing the heat-emitting medium in an opposite direction than the heat-absorbing medium.

4. The method of claim 1, wherein the joining the side walls to form manifolds further comprises transferring the heat-absorbing medium through the manifold.

* * * * *